United States Patent
Dabija et al.

(10) Patent No.: US 11,798,317 B2
(45) Date of Patent: Oct. 24, 2023

(54) DETECTION DEVICE, DETECTION METHOD, AND DETECTION PROGRAM

(71) Applicant: NIPPON TELEGRAPH AND TELEPHONE CORPORATION, Tokyo (JP)

(72) Inventors: Vlad Dabija, Mountain View, CA (US); Shmuel Ur, Shorashim (IL); David Ash, Kirkland, WA (US)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/372,025

(22) Filed: Jul. 9, 2021

(65) Prior Publication Data
US 2023/0017508 A1  Jan. 19, 2023

(51) Int. Cl.
G06V 40/16 (2022.01)
G06F 21/32 (2013.01)
G06V 20/40 (2022.01)
G06V 40/40 (2022.01)

(52) U.S. Cl.
CPC ............ *G06V 40/174* (2022.01); *G06F 21/32* (2013.01); *G06V 20/40* (2022.01); *G06V 40/40* (2022.01)

(58) Field of Classification Search
None
See application file for complete search history.

(56) References Cited

U.S. PATENT DOCUMENTS

| | | | |
|---|---|---|---|
| 10,445,481 B1* | 10/2019 | Sokolov | G06F 21/32 |
| 10,515,199 B2 | 12/2019 | Samadani et al. | |
| 10,970,895 B1* | 4/2021 | Knas | G06V 40/176 |
| 2018/0307815 A1* | 10/2018 | Samadani | G06F 21/32 |
| 2020/0034608 A1* | 1/2020 | Nduka | G06V 40/166 |
| 2020/0193667 A1* | 6/2020 | Chu | G06T 11/60 |
| 2020/0390337 A1* | 12/2020 | Frank | G01J 5/0265 |
| 2022/0415085 A1* | 12/2022 | Kawamura | G06V 40/176 |
| 2023/0066331 A1* | 3/2023 | Kumar | G06T 7/70 |

OTHER PUBLICATIONS

Essa, Irfan A., and Alex P. Pentland. "Facial expression recognition using a dynamic model and motion energy." Proceedings of IEEE International Conference on Computer Vision. IEEE, 1995. (Year: 1995).*
Kadakia, Rahil, et al. "Comparative Analysis of Micro Expression Recognition using Deep Learning and Transfer Learning." 2021 2nd Global Conference for Advancement in Technology (GCAT). IEEE, 2021. (Year: 2021).*
Ben X, Ren Y, Zhang J, Wang SJ, Kpalma K, Meng W, Liu YJ. Video-based facial micro-expression analysis: A survey of datasets, features and algorithms. IEEE transactions on pattern analysis and machine intelligence. Mar. 19, 2021;44(9):5826-46. (Year: 2021).*
Gan YS, Lien SE, Chiang YC, Liong ST. LAENet for micro-expression recognition. The Visual Computer. Mar. 22, 2023:1-5. (Year: 2023).*

* cited by examiner

Primary Examiner — Michelle M Entezari

(57) ABSTRACT

A detection device includes a processing circuit that is configured to acquire an imaging video of a user to be authenticated, specify categories of micro-expressions of the user using the acquired imaging video, and determine whether an appearance pattern of each specified category for the micro-expressions is normal.

9 Claims, 4 Drawing Sheets

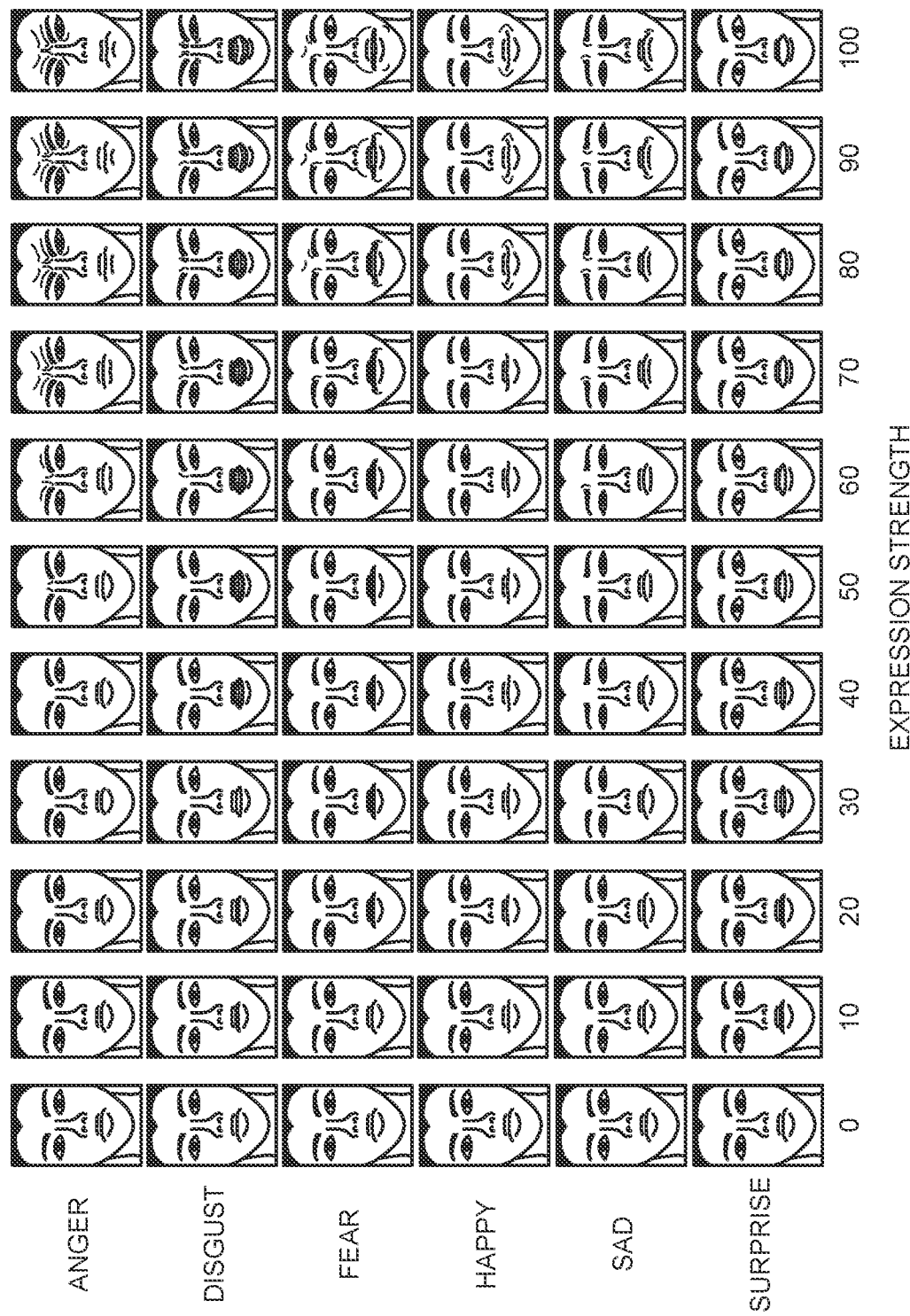

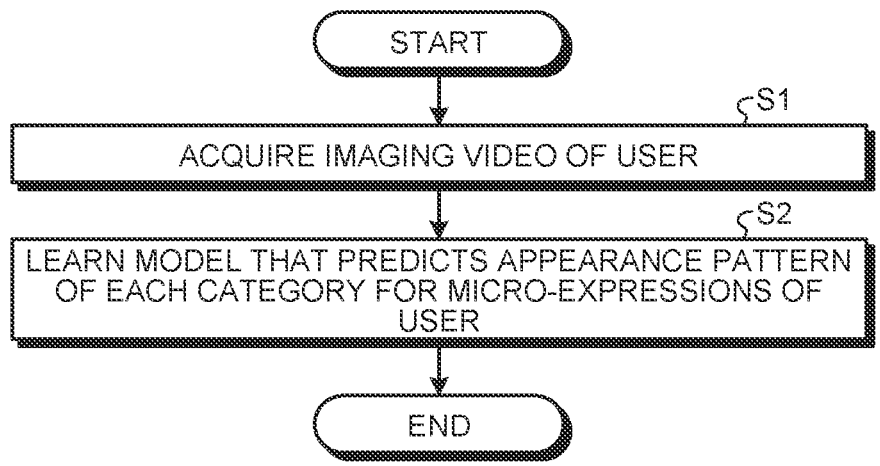
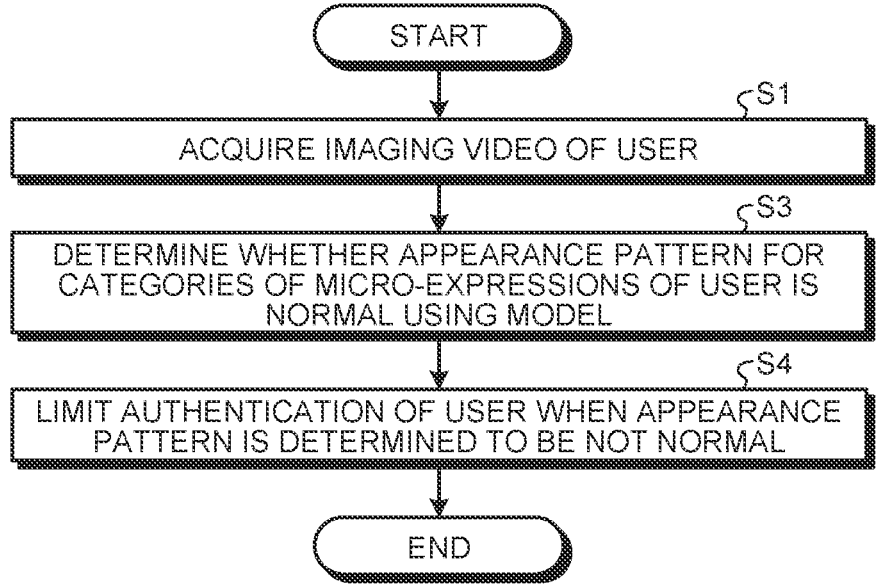

DETECTION DEVICE, DETECTION METHOD, AND DETECTION PROGRAM

BACKGROUND OF THE INVENTION

1. Field of the Invention

The present invention relates to a detection device, a detection method, and a detection program.

2. Description of the Related Art

In recent years, a large number of techniques for authenticating, among many and unspecified users attempting to access a network, a user that is permitted to access have been disclosed. On the other hand, techniques for preventing fraudulent acts performed by authenticated users are expected. For that purpose, for example, it is necessary to identify a mental state of a user to be authenticated, such as whether the user has malicious intention and whether the user is not drunk but is sober.

A technique for determining whether a person in front of a camera is a real person or a still image by monitoring visually unrecognizable micro-expressions about the person and detecting attacks with deepfakes has been disclosed (see U.S. Pat. No. 10,515,199). However, in this conventional technique, it is difficult to identify a mental state of a user to be authenticated and prevent a fraudulent act performed by this user.

In view of the foregoing, an object of the present invention is to identify a mental state of a user to be authenticated and prevent a fraudulent act performed by the authenticated user.

SUMMARY OF THE INVENTION

It is an object of the present invention to at least partially solve the problems in the conventional technology.

A detection device comprising: a memory; and a processor coupled to the memory and programmed to execute a process comprising; acquiring an imaging video of a user to be authenticated; specifying categories of micro-expressions of the user using the acquired imaging video; and determining whether an appearance pattern of each specified category for the micro-expressions is normal.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a view illustrating micro-expressions;

FIG. 3 is a flowchart illustrating detection processing procedures;

FIG. 4 is a flowchart illustrating detection processing procedures; and

DETAILED DESCRIPTION OF THE PREFERRED EMBODIMENT

A preferred embodiment of a detection device according to this invention will be described in detail with reference to the accompanying drawings. It should be noted that the embodiment is not intended to limit this invention. In the description of the drawings, like numerals are given to like parts.

Embodiment

Configuration of Detection Device

Figure 1:
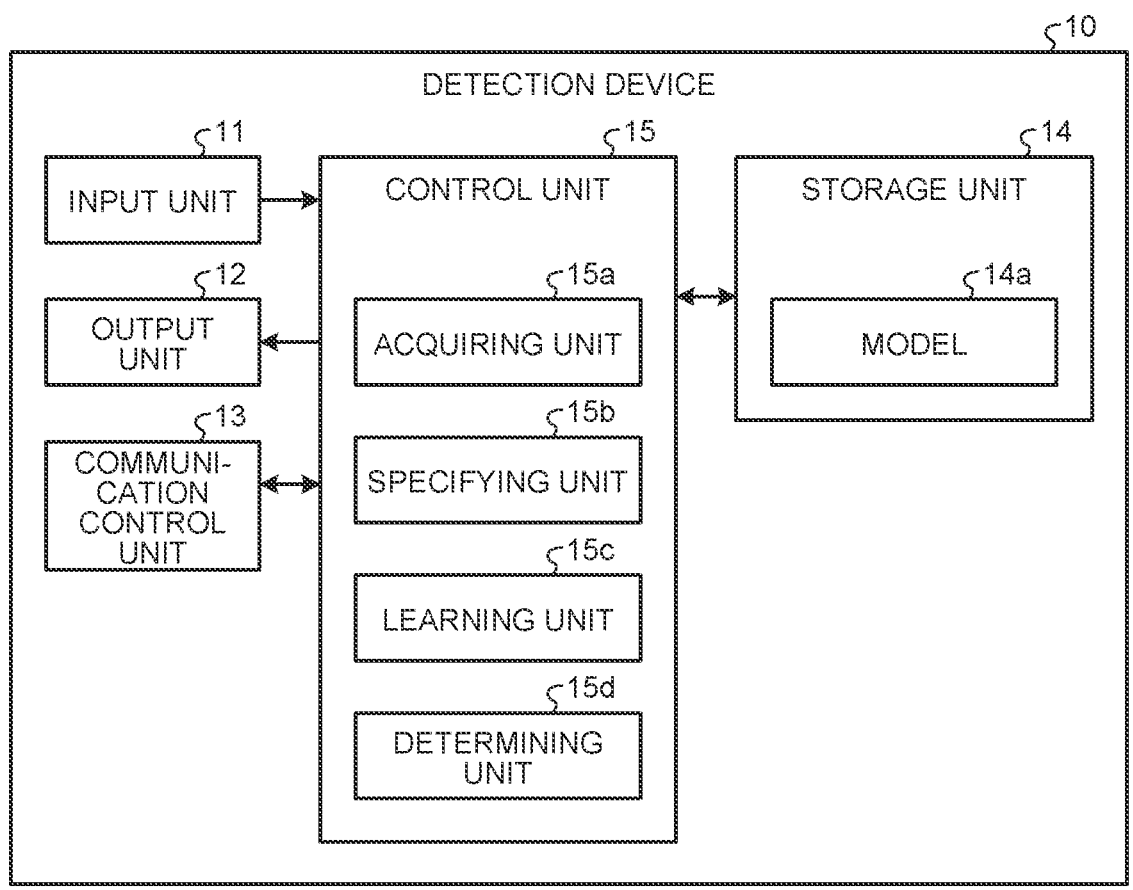
FIG. 1 is a schematic diagram illustrating the schematic configuration of a detection device of the present embodiment.

FIG. 1 is a schematic diagram illustrating the schematic configuration of a detection device of the present embodiment. As illustrated in FIG. 1, a detection device 10 of the present embodiment is implemented by general-purpose computers such as a personal computer, and includes an input unit 11, an output unit 12, a communication control unit 13, a storage unit 14, and a control unit 15.

The input unit 11 is implemented using input devices such as a keyboard and a mouse, and inputs, in response to an input operation performed by an operator, various kinds of instruction information such as the start of processing with respect to the control unit 15. The output unit 12 is implemented by display devices such as a liquid crystal display and printing devices such as a printer. For example, the output unit 12 displays a result of detection processing, which will be described later.

The communication control unit 13 is implemented by network interface cards (NICs) and the like. The communication control unit 13 controls communication between an external device via telecommunication lines such as a local area network (LAN) and the Internet and the control unit 15. For example, the communication control unit 13 controls communication between a management device and the like managing various kinds of information related to users to be authenticated and the like and the control unit 15.

The storage unit 14 is implemented by semiconductor memory devices such as a random access memory (RAM) and a flash memory or storage devices such as a hard disk and an optical disk. The storage unit 14 preliminarily stores therein a processing program for operating the detection device 10, data used during execution of the processing program, and the like, or temporarily stores them each time processing is performed. The storage unit 14 stores therein, for example, a model 14a generated in detection processing, which will be described later, and a result of the detection processing. The storage unit 14 may communicate with the control unit 15 via the communication control unit 13.

The control unit 15 is implemented using a central processing unit (CPU), a network processor (NP), a field programmable gate array (FPGA), and the like, and executes a processing program stored in a memory. In this manner, the control unit 15 functions as an acquiring unit 15a, a specifying unit 15b, a learning unit 15c, and a determining unit 15d as illustrated in FIG. 1. Each of or a part of these function units may be mounted on a different hardware. For example, the learning unit 15c may be mounted on a device different from a device on which the specifying unit 15b and the determining unit 15d are mounted. The control unit 15 may include any other function units.

The acquiring unit 15a acquires an imaging video of a user to be authenticated. Specifically, the acquiring unit 15a acquires an imaging video including a face of a user as a target of detection processing, which will be described later, via the input unit 11 or via the communication control unit 13 from an imaging device and the like. In the present embodiment, the acquiring unit 15a acquires a short, approximately one-second to three-second video of a face of a user to be authenticated that is imaged with a camera and the like of a user terminal when the user logs in. The acquiring unit 15a may store an acquired imaging video in the storage unit 14.

The specifying unit 15b specifies categories of micro-expressions of the user using the acquired imaging video. FIG. 2 is a view illustrating micro-expressions. The micro-expression indicates an expression that cannot be recognized by human's visual sense and appears as a slight change from a state of a bland expression on the user. This kind of micro-expression appears within a very short time of approximately a fraction of a second, and reflects a real mental state that cannot be hidden with intention of the user. As illustrated in FIG. 2, micro-expressions are classified into categories depending on the strength of emotions such as anger, fear and surprise for each user. In the example illustrated in FIG. 2, micro-expressions of a user are classified into categories of all 66 facial action units formed of the 11-level strength that is strengthened in order of 0 (bland expression), 10, . . . , and 100 for six kinds of feelings such as anger, disgust, fear, happy, sad, and surprise.

The specifying unit 15b uses, for example, a large number of imaging videos of a user to be authenticated that is in a normal state as correct answer data and applies a well-known algorithm so as to learn distribution of feature amounts of categories in facial action units of this user. In this manner, the specifying unit 15b can classify micro-expressions included in the input imaging video of this user into categories. Thus, the detection device 10 can classify categories in facial action units that are different for users with high accuracy.

The learning unit 15c uses categories of micro-expressions included in the acquired imaging video as correct answer data and learns the model 14a that predicts an appearance pattern of each category for micro-expressions of a user. For example, in a situation where a user negotiates with a specific client with which the user does not have a good emotional relation, the user is likely to show expression of fear. Even the same user has a different mental state depending on the time of day, places, and the like, and the user may show different micro-expressions. For example, in the night hours after a user has worked all day, the user is tired or is relaxed, and the user is likely to show micro-expressions different from micro-expressions in the morning hours before work. Thus, a user may show different micro-expressions even though the user is in a normal state.

The learning unit 15c uses an appearance pattern of each category for micro-expressions included in a large number of imaging videos for each user that is in a normal state as correct answer data, and generates the model 14a that predicts an appearance pattern of each category for micro-expressions of this user that is in a normal state through learning. The appearance pattern is specified by, for example, appearance frequency of each category for micro-expressions, and a plurality of different appearance patterns can be specified for each user depending on a situation. Thus, the detection device 10 can predict the tendency of micro-expressions appearing in a specific situation that is different for each user.

The learning unit 15c continues and executes unsupervised learning about the user. In other words, the learning unit 15c further performs learning using categories of micro-expressions included in an imaging video as a processing target of the determining unit 15d. In this manner, the detection device 10 can absorb a change in facial features associated with muscle activity changed with a lapse of time about the user and predict an appearance pattern for micro-expressions of this user with high accuracy.

Learning of the model 14a is not limited to a case where the model 14a performs learning from the first for each user as described above. For example, by generating a standard model 14a that has performed learning using imaging videos of all users through learning and performing additional learning using an imaging video of a user to be authenticated, the model 14a that predicts an appearance pattern of each category for micro-expressions of the user may be generated.

By generating a basic model 14a about the user using imaging videos at variously different time of day and places for each user and performing additional learning immediately before the user is defined as a user to be authenticated, the model 14a that predicts an appearance pattern of each category for micro-expressions at the point of authentication and at an authentication place may be generated. In this manner, the highly accurate model 14a can be efficiently generated.

The determining unit 15d determines whether an appearance pattern of each specified category for micro-expressions is normal. Specifically, the determining unit 15d inputs categories of micro-expressions included in an acquired imaging video of the user into the learned model 14a and makes a comparison with a predicted appearance pattern so as to determine whether an appearance pattern of each specified category for the micro-expressions of the user is normal.

For example, as for an appearance pattern for specified category for the micro-expressions, when a difference from a predicted normal appearance pattern is equal to or a greater than a predetermined threshold, the determining unit 15d determines that the appearance pattern is not normal. In this manner, the determining unit 15d can detect micro-expressions that cannot be predicted from expressions in a past normal state, and assume that a mental state of the user is not normal.

For example, a malicious user that is dissatisfied with a company and attempts to commit fraud from now is more likely to show an expression of "fear" than an ordinary normal state because the user is fearful of being exposed. In this case, the determining unit 15d can assume that a mental state of this kind of legitimate but malicious user is not normal.

Similarly, the determining unit 15d can assume that a mental state of a user that is drunk and cannot make a right decision is not normal.

When determining that an appearance pattern of each specified category for micro-expressions of a user is not normal, the determining unit 15d limits authentication of this user. For example, the determining unit 15d denies access by the user to an intracompany network, in other words, login.

The determining unit 15d may execute additional authentication procedures to the user. In this case, it is preferable that the determining unit 15d further acquire an imaging video of the user and continue monitoring.

After login of a user is permitted, the determining unit 15d may limit access by the user to predetermined data. For example, the determining unit 15d denies access by the user to sensitive data.

The determining unit 15d may output a warning message to an administrator. In this case, it is preferable that the administrator monitor actions such as an operation of the user.

In this manner, detection processing performed by the detection device 10 can be executed at a certain timing. The detection device 10 can take, to a user determined that a mental state is not normal by the determining unit 15d, measures following a security policy of a network accessed by the user.

Detection Processing

The following describes detection processing performed by the detection device 10 according to the present embodiment with reference to FIGS. 3 and 4. FIGS. 3 and 4 are flowcharts illustrating detection processing procedures. The detection processing of the present embodiment includes learning processing and determining processing. FIG. 3 indicates learning processing procedures. The flowchart in FIG. 3 starts, for example, at a timing when an instruction for starting learning processing is input.

The acquiring unit 15a acquires an imaging video of a user to be authenticated (step S1).

Subsequently, the specifying unit 15b specifies categories of micro-expressions of the user using the acquired imaging video. The learning unit 15c uses categories of micro-expressions included in the acquired imaging video as correct answer data, and learns the model 14a that predicts an appearance pattern of each category for micro-expressions of the user (step S2).

For example, the learning unit 15c uses an appearance pattern of each category for micro-expressions included in a large number of imaging videos for each user that is in a normal state as correct answer data, and generates the model 14a that predicts an appearance pattern of each category for micro-expressions of this user that is in a normal state through learning. In this manner, a series of learning processing ends.

Subsequently, FIG. 4 illustrates determining processing procedures. The flowchart in FIG. 4 starts, for example, at a timing when an instruction for starting determining processing is input.

The acquiring unit 15a acquires an imaging video of a user to be authenticated (step S1).

Subsequently, the specifying unit 15b specifies categories of micro-expressions of the user using the acquired imaging video. The determining unit 15d makes a comparison with an appearance pattern that is predicted using the categories of the micro-expressions included in the acquired imaging video of the user and the learned learning model 14a so as to determine whether an appearance pattern of each specified category for the micro-expressions of the user is normal (step S3).

When determining that an appearance pattern of each specified category for the micro-expressions of the user is not normal, the determining unit 15d limits authentication of this user (step S4). For example, the determining unit 15d denies login of the user to an intracompany network. The determining unit 15d executes additional authentication procedures to the users. After login of a user is permitted, the determining unit 15d denies access by the user to predetermined sensitive data. The determining unit 15d outputs a warning message to an administrator. In this manner, the determining unit 15d takes measures following a security policy of a network accessed by a user determined that a mental state is not normal. Then, a series of determining processing ends.

The detection processing performed by the detection device 10 can be executed at a certain timing.

As described above, in the detection device 10 of the present embodiment, the acquiring unit 15a acquires an imaging video of a user to be authenticated. The specifying unit 15b specifies categories of micro-expressions of the user using the acquired imaging video. The determining unit 15d determines whether an appearance pattern of each specified category for the micro-expressions is normal. In this manner, the detection device 10 can detect the fact that micro-expressions reflecting a real mental state of the user are different from expressions in an ordinarily normal state. Thus, the detection device 10 can identify a mental state of a user to be authenticated and prevent a fraudulent act performed by the authenticated user.

The learning unit 15c uses categories of micro-expressions included in the acquired imaging video as correct answer data, and learns a model that predicts an appearance pattern of each category for micro-expressions of a user. In this case, the determining unit 15d inputs the categories of the micro-expressions included in the acquired imaging video of the user into the learned model 14a, and makes a comparison with the predicted appearance pattern so as to determine whether an appearance pattern of each specified category for the micro-expressions of the user is normal. In this manner, the detection device 10 can detect micro-expressions that cannot be predicted from expressions in the past normal state, and assume that a mental state of the user is not normal.

When determining that an appearance pattern of each specified category for micro-expressions is not normal, the determining unit 15d limits authentication of a user. For example, the determining unit 15d executes additional authentication procedures to the user. The determining unit 15d limits access by the user to predetermined data. The determining unit 15d outputs a warning message to an administrator. In this manner, the detection device 10 can take appropriate measures following a security policy of a network.

The learning unit 15c further performs learning using categories of micro-expressions included in an imaging video as a processing target of the determining unit 15d. In this manner, the detection device 10 can absorb a change in facial features associated with muscle activity changed with a lapse of time about the user and predict an appearance pattern for micro-expressions of this user with high accuracy.

Computer Program

A computer program that describes processing executed by the detection device 10 according to the embodiment in a computer-executable language can be created. As one embodiment, the detection device 10 can be implemented by installing a detection program that executes the detection processing described above as packaged software and online software into a desired computer. For example, by causing an information-processing device to execute the detection program described above, the information-processing device can function as the detection device 10. The information-processing device mentioned here includes a desktop or a laptop personal computer. Besides, mobile communication terminals such as a smartphone, a mobile phone, and a personal handyphone system (PHS), slate terminals such as a personal digital assistant (PDA), and the like are in the category of the information-processing device. In addition, functions of the detection device 10 may be implemented in a cloud server.

Figure 5:
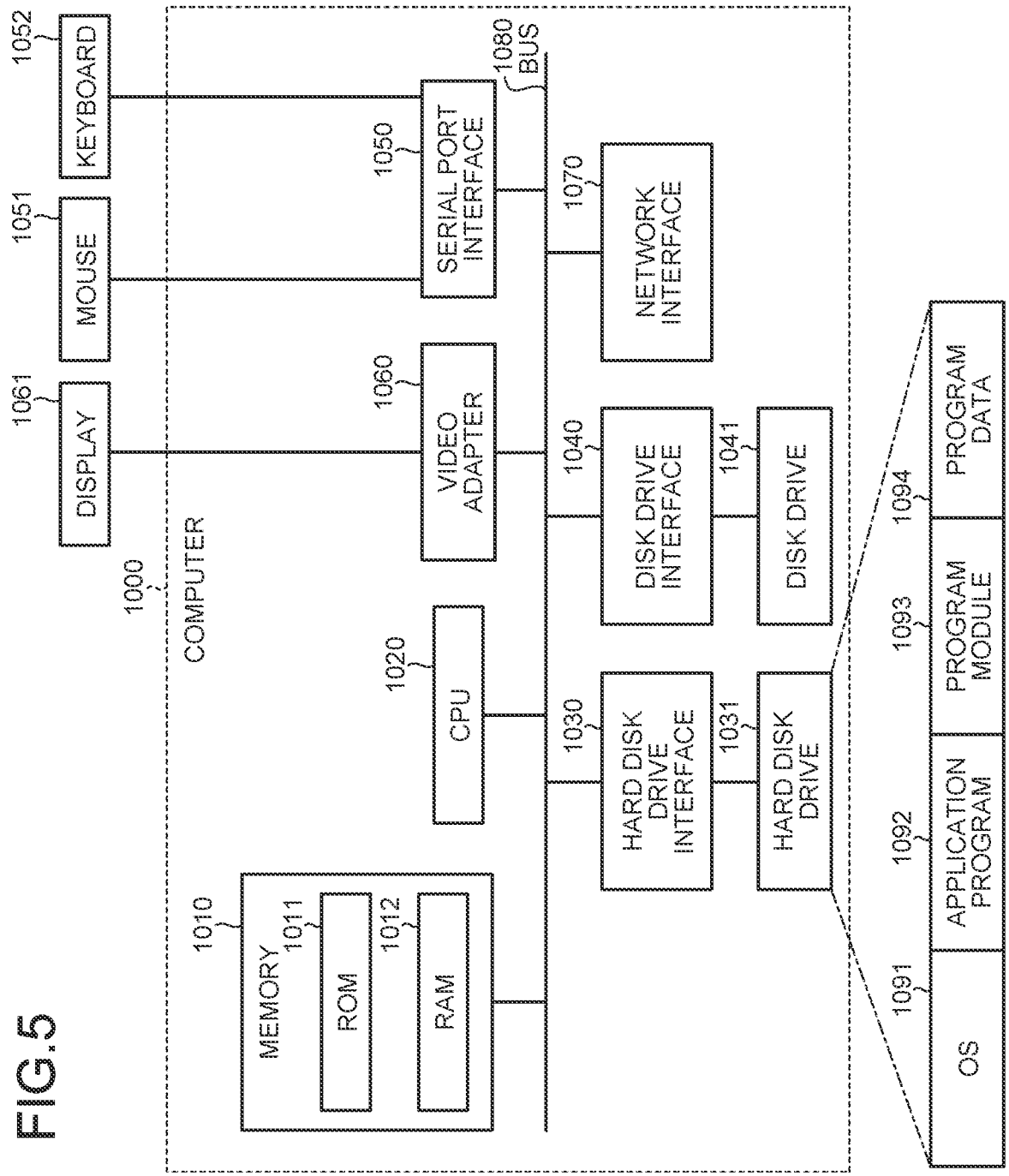
FIG. 5 is a view illustrating an example of a computer that executes a detection program.

FIG. 5 is a view illustrating an example of a computer that executes a detection program. A computer 1000 includes, for example, a memory 1010, a CPU 1020, a hard disk drive interface 1030, a disk drive interface 1040, a serial port interface 1050, a video adapter 1060, and a network interface 1070. Those units are connected one another by a bus 1080.

The memory 1010 includes a read only memory (ROM) 1011 and a RAM 1012. The ROM 1011 stores therein, for example, a boot program of a basic input output system (BIOS) and the like. The hard disk drive interface 1030 is connected to a hard disk drive 1031. The disk drive interface 1040 is connected to a disk drive 1041. For example, attachable/detachable storage media such as a magnetic disk and an optical disk are inserted into the disk drive 1041. For example, a mouse 1051 and a keyboard 1052 are connected to the serial port interface 1050. For example, a display 1061 is connected to the video adapter 1060.

The hard disk drive 1031 stores therein, for example, an operating system (OS) 1091, an application program 1092, a program module 1093, and program data 1094. Each information described in the embodiment is stored in, for example, the hard disk drive 1031 and the memory 1010.

The detection program is stored in the hard disk drive 1031 as, for example, the program module 1093 that describes commands executed by the computer 1000. Specifically, the program module 1093 that describes each processing executed by the detection device 10 described in the embodiment is stored in the hard disk drive 1031.

Data used in information processing by the detection program is stored as the program data 1094 in, for example, the hard disk drive 1031. The CPU 1020 reads the program module 1093 and the program data 1094 stored in the hard disk drive 1031 into the RAM 1012 as needed, and executes each procedure described above.

The program module 1093 and the program data 1094 according to the detection program are not always stored in the hard disk drive 1031, and may be stored in, for example, an attachable/detachable storage medium and be read by the CPU 1020 via the disk drive 1041 and the like. The program module 1093 and the program data 1094 according to the detection program may be stored in the other computer connected via networks such as a local area network (LAN) and a wide area network (WAN), and be read by the CPU 1020 via the network interface 1070.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A detection device comprising:
   a memory; and
   a processor coupled to the memory and programmed to execute a process comprising;
   acquiring an imaging video of a user to be authenticated;
   specifying, based on a micro-expression of the user in the acquired imaging video, a category of emotion of the user and a strength of the category of the emotion using a trained machine learning model,
      wherein the micro-expression indicates a user expression appearing as a deviation from a state of a bland user expression according to muscle activity for a less than a predetermined time threshold,
      the user expression is unrecognizable by a human's visual sense according to a change in facial features associated with the muscle activity appearing in the acquired imaging video, and
      the trained machine learning model uses the change of facial features associated with the muscle activity in the micro-expression as input to predict the category of the emotion and the strength of the category of the emotion of a plurality of emotions; and
   determining, based on a predetermined threshold of a difference in strengths of a plurality of categories of the emotion between the micro-expression and a predicted normal appearance pattern, whether an appearance pattern of the specified category of the plurality of categories of the emotion for the micro-expressions is normal.

2. The detection device according to claim 1, further comprising:
   learning, using the plurality of categories of micro-expressions included in the acquired imaging video as correct answer data, a machine learning model to generate the trained machine learning model, wherein the machine learning model predicts an appearance pattern of each category for micro-expressions of the user, and
   wherein the specifying the category of the emotion further includes in the acquired imaging video of the user into the trained machine learning model and make a comparison with the predicted normal appearance pattern to determine whether an appearance pattern of each specified category for the micro-expressions of the user is normal.

3. The detection device according to claim 2, wherein the learning further performs unsupervised learning using a set of the specified category of the emotion associated with the micro-expression in the acquired imaging video and whether the appearance pattern is normal as determined in the determining as training data.

4. The detection device according to claim 1, wherein the determining further comprises limiting authentication of the user when determining that an appearance pattern of the specified category for the micro-expressions is not normal.

5. The detection device according to claim 4, wherein the determining executes additional authentication procedures.

6. The detection device according to claim 4, wherein the determining limits access by the user to predetermined data.

7. The detection device according to claim 4, wherein the determining outputs a warning message to an administrator.

8. A detection method executed by a detection device comprising:
   acquiring an imaging video of a user to be authenticated;
   specifying, based on a micro-expression of the user in the acquired imaging video, a category of emotion of the user and a strength of the category of the emotion using a trained machine learning model,
      wherein the micro-expression indicates a user expression appearing as a deviation from a state of a bland user expression according to muscle activity for a less than a predetermined time threshold,
      the user expression is unrecognizable by a human's visual sense according to a change in facial features associated with the muscle activity, and
      the trained machine learning model uses the change of facial features associated with the muscle activity in the micro-expression as input to predict the category of the emotion and the strength of the category of the emotion of a plurality of emotions; and
   determining, based on a predetermined threshold of a difference in strengths of a plurality of categories of the emotion between the micro-expression and a predicted normal appearance pattern, whether an appearance pattern of the specified category of the plurality of categories of the emotion for the micro-expressions is normal.

9. A computer-readable non-transitory recording medium having stored a detection program that causes a computer to execute:
- acquiring an imaging video of a user to be authenticated;
- specifying, based on a micro-expression of the user in the acquired imaging video, a category of emotion of the user and a strength of the category of the emotion using a trained machine learning model,
  - wherein the micro-expression indicates a user expression appearing as a deviation from a state of a bland user expression according to muscle activity for a less than a predetermined time threshold,
  - the user expression is unrecognizable by a human's visual sense according to a change in facial features associated with the muscle activity, and
  - the trained machine learning model uses the change of facial features associated with the muscle activity in the micro-expression as input to predict the category of the emotion and the strength of the category of the emotion of a plurality of emotions; and
- determining, based on a predetermined threshold of a difference in strengths of a plurality of categories of the emotion between the micro-expression and a predicted normal appearance pattern, whether an appearance pattern of the specified category of the plurality of categories of the emotion for the micro-expressions is normal.

* * * * *